United States Patent
Oesterling et al.

(10) Patent No.: US 9,886,855 B2
(45) Date of Patent: Feb. 6, 2018

(54) SYSTEMS AND METHODS FOR MONITORING A PARKING SPACE

(71) Applicant: GENERAL MOTORS LLC, Detroit, MI (US)

(72) Inventors: Christopher L. Oesterling, Troy, MI (US); Paul H. Pebbles, Novi, MI (US); Peter B. Kosak, Northville, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 15/163,540

(22) Filed: May 24, 2016

(65) Prior Publication Data
US 2017/0345304 A1 Nov. 30, 2017

(51) Int. Cl.
- *G08G 1/14* (2006.01)
- *H04W 4/00* (2009.01)
- *G08G 1/097* (2006.01)

(52) U.S. Cl.
CPC ............ *G08G 1/149* (2013.01); *G08G 1/097* (2013.01); *G08G 1/146* (2013.01); *H04W 4/008* (2013.01)

(58) Field of Classification Search
CPC .......... G08G 1/142; G08G 1/147; G08G 1/04; G08G 1/017; G08G 1/0962; G08G 1/14; G08G 1/012; G08G 1/09675; G08G 1/144; G08G 1/146; G08G 1/161; G08G 1/166; G08G 1/168; G08G 1/205; G01C 21/3685
USPC ......... 340/932.2, 426.16, 5.1, 5.2, 5.7, 5.72, 340/5.6, 5.61, 5.62, 5.64, 907, 928
See application file for complete search history.

(56) References Cited

U.S. PATENT DOCUMENTS

| | | | | |
|---|---|---|---|---|
| 5,153,586 A * | 10/1992 | Fuller | .................... | G07B 15/02 340/932.2 |
| 5,631,642 A * | 5/1997 | Brockelsby | ............ | G08G 1/127 340/426.16 |
| 2007/0136127 A1 * | 6/2007 | Li | .......................... | G07B 15/04 705/13 |
| 2014/0176349 A1 * | 6/2014 | Smullin | ................. | G08G 1/142 340/932.2 |
| 2014/0335897 A1 * | 11/2014 | Clem | .................... | G08G 1/0112 455/456.3 |
| 2016/0049077 A1 * | 2/2016 | Sandbrook | ............. | G08G 1/142 340/932.2 |
| 2017/0116790 A1 * | 4/2017 | Kusens | .................. | G07B 15/02 |

* cited by examiner

Primary Examiner — Daniel Previl
(74) *Attorney, Agent, or Firm* — Lorenz & Kopf, LLP

(57) ABSTRACT

Systems and methods are provided for monitoring a parking space with a sign. A sensor monitors the parking space and generate sensor data. A short-range transceiver receives a vehicle identification key and communicates over a short-range communication channel. A processor module is communicatively coupled with the sensor and the short-range transceiver. The processor module is configured to determine whether a vehicle in the parking space is an approved vehicle or an unapproved vehicle based on at least one of the sensor data and the vehicle identification key. The processor module generates a first notification when the the approved vehicle is in the parking space and a second notification when unapproved vehicle is in the parking space. The first and second notifications are transmitted by the short-range transceiver over the short-range communication channel.

20 Claims, 4 Drawing Sheets

SYSTEMS AND METHODS FOR MONITORING A PARKING SPACE

TECHNICAL FIELD

The technical field generally relates to area monitoring systems, and more particularly relates to systems and methods for monitoring a parking space using a sign or marker.

BACKGROUND

Vehicle sharing and self-serve vehicle rental services allow consumers to make reservations for station based round trip use of vehicles, particularly in urban environments. These rental vehicles are often located in reserved parking spaces that are identified with permanently mounted signs or markers. Ideally, a user picks up a vehicle from a reserved parking space and returns the vehicle to the same parking space or a similarly marked space nearby. However, as these reserved parking spaces are often found in public parking lots in urban areas, unauthorized vehicles may be parked in the reserved spaces. This can frustrate the user and prevent them from returning the rental vehicle in a timely manner.

Surveillance systems such as video monitoring systems are used to observe an area and provide a live feed or recording of the monitored area. However, these systems are often expensive and can be vulnerable to vandalism. Furthermore, conventional surveillance systems are unable to easily identify whether a vehicle parked in a reserved spot is an authorized rental vehicle or an unauthorized vehicle.

Accordingly, it is desirable to provide systems and methods for monitoring a parking space. It is additionally desirable to detect when an authorized or unauthorized vehicle is parked in the parking space and notify the user or rental company. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for monitoring a parking space. In one non-limiting example, a sign for monitoring a parking space includes, but is not limited to, a sensor configured to monitor the parking space and generate sensor data. The sign further includes, but is not limited to, a short-range transceiver configured to receive a vehicle identification key and communicate over a short-range communication channel. The sign further includes, but is not limited to, a processor module communicatively coupled with the sensor and the short-range transceiver. The processor module is configured to determine whether a vehicle in the parking space is an approved vehicle or an unapproved vehicle based on at least one of the sensor data and the vehicle identification key. The processor module is further configured to generate a first notification when the processor module determines that the approved vehicle is in the parking space and a second notification when the processor module determines that the unapproved vehicle is in the parking space. The first and second notifications are transmitted by the short-range transceiver over the short-range communication channel.

In another non-limiting example, a system for monitoring a parking space for a vehicle includes, but is not limited to, a beacon on the vehicle configured to transmit a vehicle identification key and communicate over a short-range communication channel. The system further includes, but is not limited to, a sign having a sensor configured to monitor the parking space and generate sensor data. The sign further includes, but is not limited to, a short-range transceiver configured to receive the vehicle identification key and communicate over the short-range communication channel. The sign further includes, but is not limited to, a processor module communicatively coupled with the sensor and the short-range transceiver. The processor module is configured to determine whether the vehicle in the parking space is an approved vehicle or an unapproved vehicle based on at least one of the sensor data and the vehicle identification key. The processor module is further configured to generate a first notification when the processor module determines that the approved vehicle is in the parking space and a second notification when the processor module determines that the unapproved vehicle is in the parking space. The first and second notifications are transmitted by the short-range transceiver over the short-range communication channel.

In another non-limiting example, a method is provided for monitoring a parking space with a sign. The method includes, but is not limited to, detecting, with a sensor, a vehicle in the parking space. The method further includes, but is not limited to, generating, with the sensor, sensor data when the vehicle is detected. The method further includes, but is not limited to, receiving, with a short-range transceiver, a vehicle identification key from a beacon on an approved vehicle over a short-range communication channel. The method further includes, but is not limited to, determining, with a processor module, whether the vehicle is the approved vehicle or an unapproved vehicle based on the sensor data and the vehicle identification key. The method further includes, but is not limited to, generating, with the processor module, a first notification when the vehicle is determined to be the approved vehicle and a second notification when the vehicle is determined to be the unapproved vehicle. The method further includes, but is not limited to, transmitting, with the short-range transceiver, at least one of the first and second notifications and the sensor data over the short-range communication channel.

DESCRIPTION OF THE DRAWINGS

The disclosed examples will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
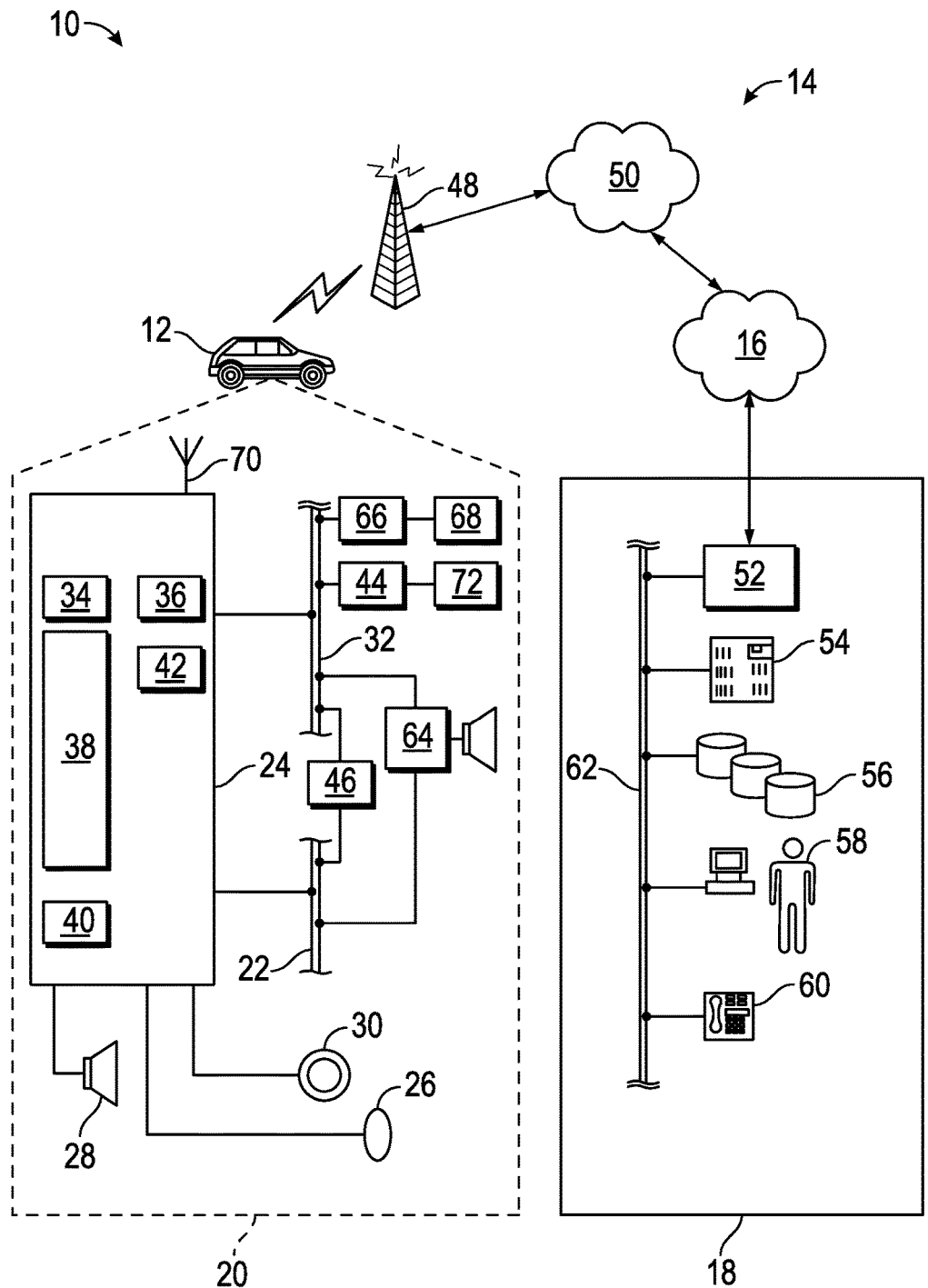
FIG. 1 is a diagram illustrating a non-limiting example of a communication system.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
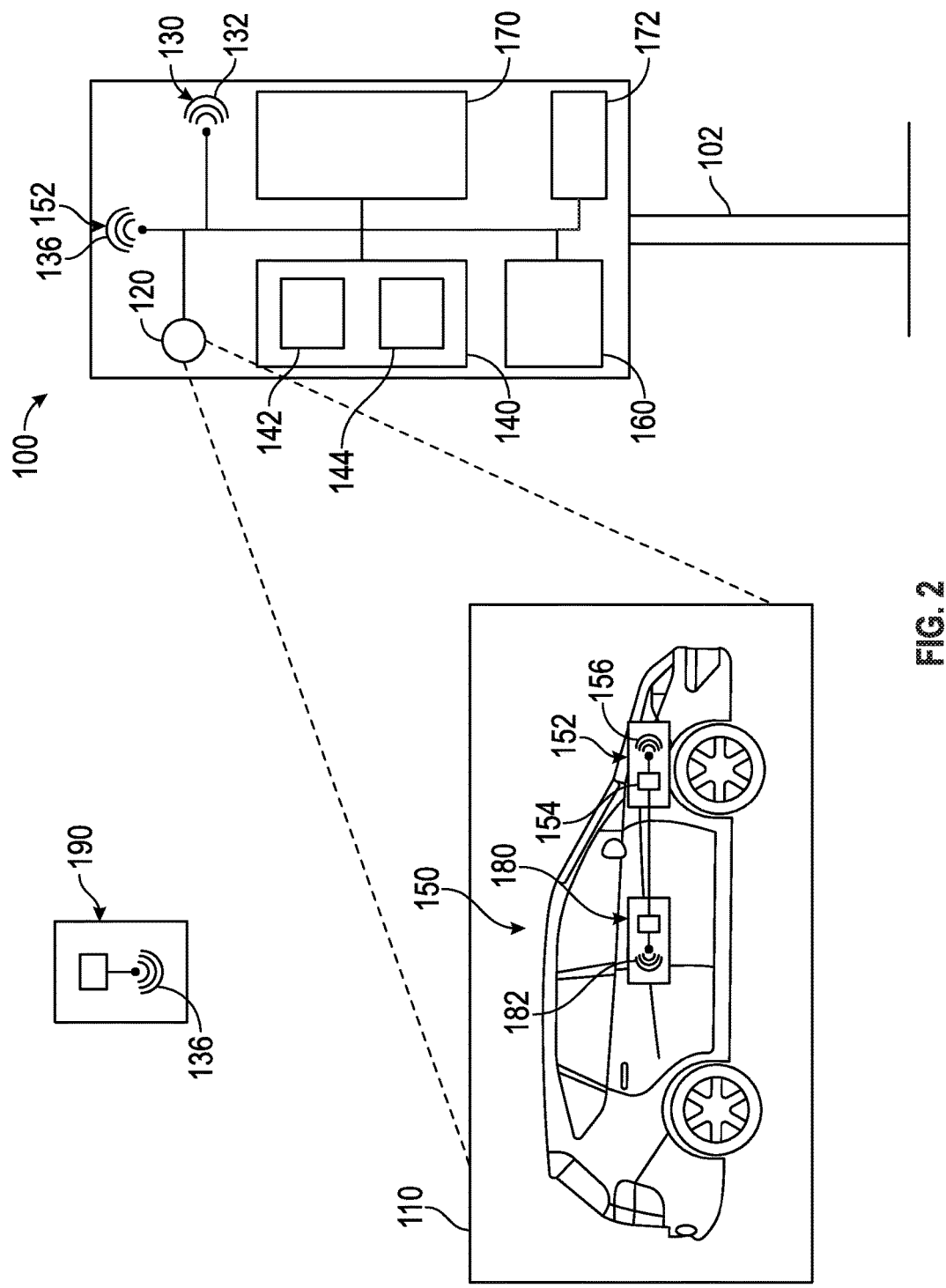
FIG. 2 is a diagram illustrating a non-limiting example of a sign for monitoring a parking space according to an embodiment.
Figure 3:
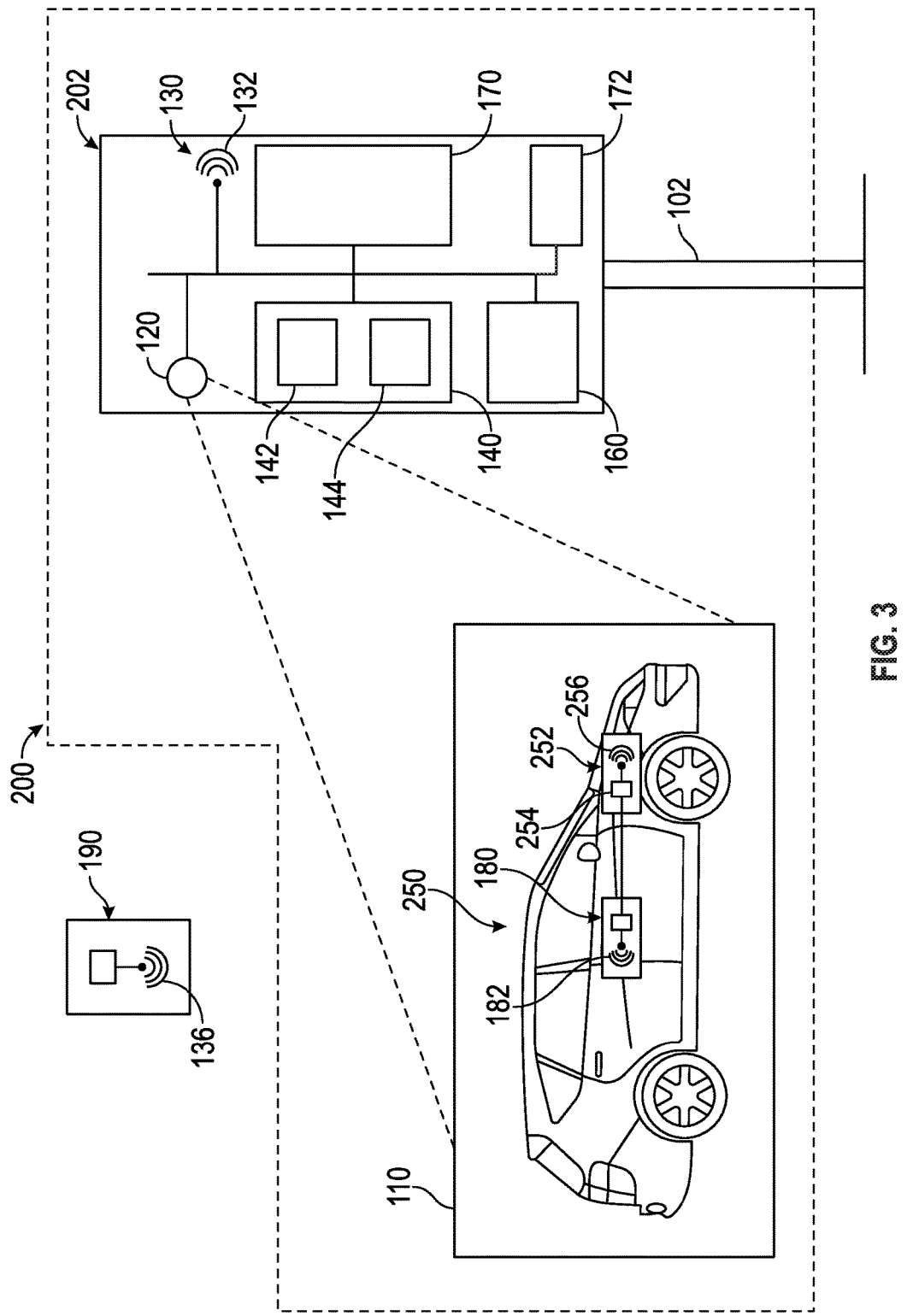
FIG. 3 is a diagram illustrating a non-limiting example of a system for monitoring a parking space for a vehicle according to an embodiment.
Figure 4:
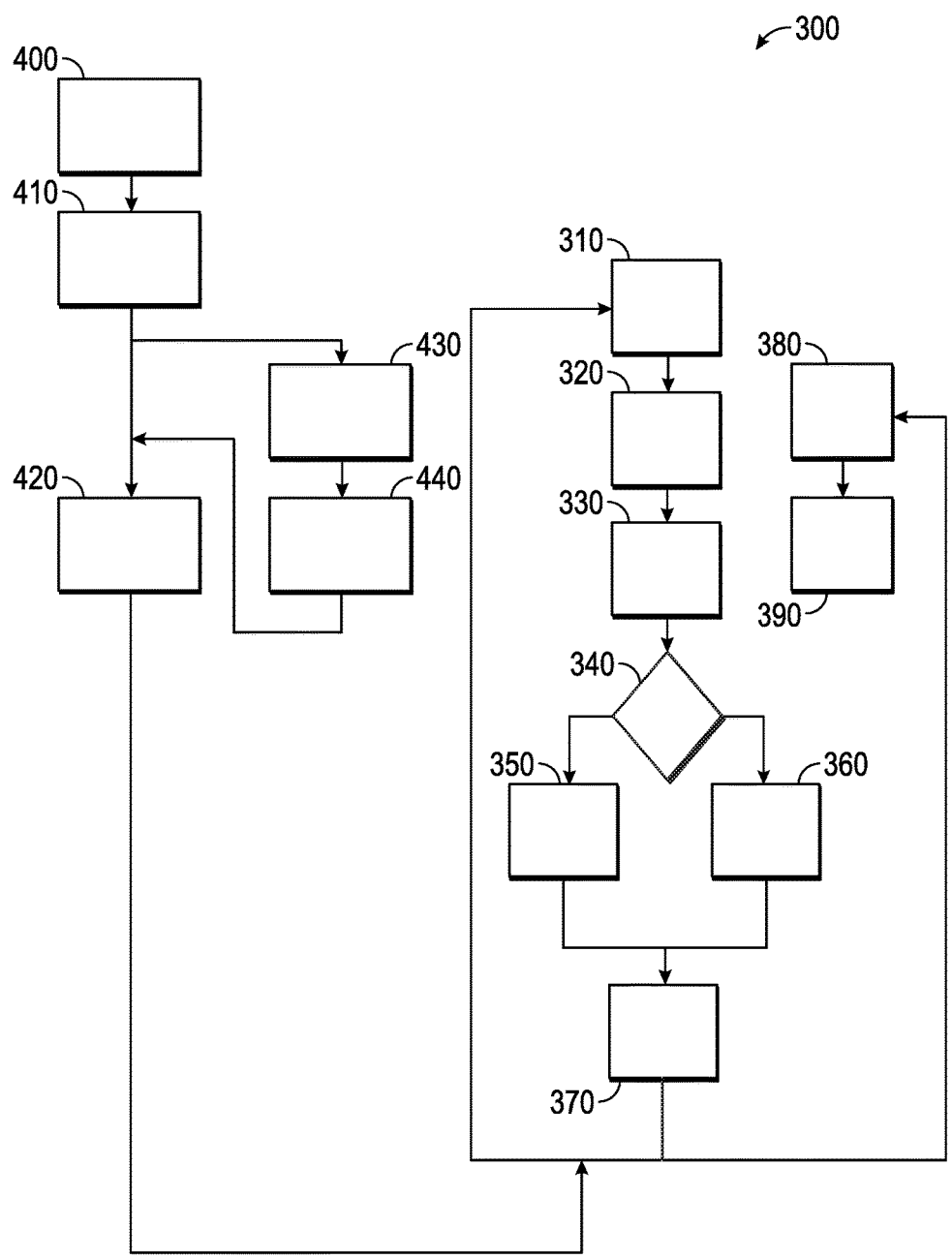
FIG. 4 is a flowchart illustrating a non-limiting example of a method for monitoring a parking space.

With reference to FIGS. 2-4, there is shown a non-limiting example of a sign 100 for monitoring a parking space 110. It should be appreciated that the overall architecture, setup and operation, as well as the individual components of the illustrated sign 100 are merely exemplary and that differently configured signs may also be utilized to implement the examples of the sign 100 disclosed herein. Thus, the following paragraphs, which provide a brief overview of the illustrated sign 100, are not intended to be limiting.

The sign 100 for monitoring the parking space 110 generally includes a sensor 120, a short-range transceiver 130, and a processor module 140. As shown in FIG. 2, the sensor 120 is configured to monitor the parking space 110 and generate sensor data. The short-range transceiver 130 is configured to receive a vehicle identification key 154 and communicate over a short-range communication channel 132. The processor module 140 is communicatively coupled with the sensor 120 and the short range transceiver 130. The processor module 140 is configured to determine whether a vehicle in the parking space 110 is an approved vehicle 150 or an unapproved vehicle based on at least one of the sensor data and the vehicle identification key 154. The processor module 140 is further configured to generate a first notification 142 when the processor module 140 determines that the approved vehicle 150 is in the parking space 110 and a second notification 144 when the unapproved vehicle is in the parking space 110. The first and second notifications 142, 144 are transmitted by the short-range transceiver 130 over the short-range communication channel 132.

In a non-limiting embodiment of the sign 100, a beacon 152 is positioned within the approved vehicle 150. Approved vehicle 150 may be any type of mobile vehicle such as a car, truck, recreational vehicle (RV), boat, plane, etc., and is equipped with at least one beacon 152. In a non-limiting embodiment, the beacon 152 is onboard the approved vehicle 150 and further includes the vehicle identification key 154 and a vehicle short-range transceiver 156.

In a non-limiting embodiment, the first communication channel 132 is a wireless protocol and includes at least one of a Bluetooth low power protocol, a Bluetooth protocol, a ZigBee protocol, an iBeacon protocol, an Eddystone protocol, a near field communication protocol, a Wi-Fi protocol, or a combination thereof. One skilled in the art will appreciate that the transceivers 130 156 are configured to communicate over a combination of the previously disclosed wireless protocols.

In a non-limiting embodiment, the sign 100 is installed on a sign post 102, a wall (not shown), or otherwise positioned so as to monitor the parking space 110. Reserved parking spaces are often marked with a sign, plaque, or marker having indicia used to convey that the parking space 110 is reserved and not to be used by the general public. For example, while not depicted herein, the sign 100 may feature a corporate design or other symbol associated with a vehicle rental service. In a non-limiting embodiment, the sign 100 looks similar to a conventional parking sign, i.e. a sign without the monitoring capabilities described herein. In this way, the sign 100 is indistinguishable from a conventional parking sign and does not immediately convey the increased monitoring capabilities so that the sign 100 can inconspicuously monitor the parking space 110.

In a non-limiting embodiment, the sensor 120 is arranged in the sign 100 to monitor the parking space 110 and generate sensor data. In a non-limiting embodiment, the sensor 120 is a camera, a motion sensor, an ultrasonic sensor, or a combination thereof. A camera may generate sensor data including still images, such as a time lapse, or a continuous video stream. In addition, a motion sensor and a camera may be used in combination in the sign 100. For example, the camera may only capture video or images when the motion sensor detects movement or a change in the state of the parking space 110. In a non-limiting embodiment, an exterior portion of the sensor 120, for example the lens of a camera, is disguised or hidden within the design or indicia on the exterior of the sign 100 to prevent the sensor 120 from being easily visible. As detailed above, such an arrangement helps the sign 100 inconspicuously monitor the parking space 110.

In a non-limiting embodiment, the short-range transceiver 130 is configured to receive the vehicle identification key 154 and communicate over the short-range communication channel 132. In a non-limiting embodiment, the short-range transceiver 130 receives the vehicle identification key 154 from the approved vehicle 150 when the approved vehicle 150 is within transmission range of the short-range communication channel 132. In a non-limiting example, the short-range transceiver 130 receives the vehicle identification key 154 when the approved vehicle is parked in the parking space 110. In a non-limiting embodiment, the short-range transceiver 130 receives the vehicle identification key 154 when the approved vehicle 150 approaches the sign 100.

The processor module 140 is communicatively coupled with the sensor 120 and the short-range transceiver 130. The processor module 140 is configured to determine whether a vehicle in the parking space 110 is the approved vehicle 150 and an unapproved vehicle based on at least one of the sensor data and the vehicle identification key 154. The term "module" as used herein refers to a combination of hardware, software, and/or firmware. In a non-limiting example, the processor module 140 includes an integrated circuit associated with non-transitory medium to store code to be executed by the integrated circuit. The processor module 140 uses the sensor data and the vehicle identification key 154 to determine the type of vehicle in the parking space 110. In a non-limiting embodiment, approved vehicles 150 are equipped with beacons 152 having the vehicle identification key 154 and the vehicle short-range transceiver 156. In this way, the processor module 140 identifies the presence of the approved vehicle 150 versus an unapproved vehicle based upon the vehicle identification key 154.

In a non-limiting embodiment, the processor module 140 is configured to determine whether the vehicle in the parking space 110 is the approved vehicle 150 versus the unapproved vehicle based upon the sensor data. For example, if the beacon 152 is damaged or if the short-range transceiver 130 is unable to receive the vehicle identification key 154, the sensor data may be used to identify the approved vehicle 150 based on the shape and color of the approved vehicle 150, a license plate, a QR code, or other visually identifiable features. In this way, the processor module 140 determines whether the vehicle in the parking space 110 is an approved vehicle 150 or an unapproved vehicle.

In a non-limiting embodiment, the processor module 140 is further configured to generate a first notification 142 when the approved vehicle 150 is in the parking space 110. Conversely, the processor module 140 is configured to generate a second notification 144 when the unapproved vehicle is in the parking space 110. The first and second notifications 142, 144 are transmitted by the short-range transceiver 130 over the short-range communication channel 132. In this way, the sign 100 monitors the parking space 110 and generates notifications 142, 144 based upon the vehicle 150 that parks in the parking space 110.

In a non-limiting embodiment, the sign 100 includes a memory module 160 configured to store the sensor data. Beyond identifying whether the vehicle is the approved vehicle 150 or the unapproved vehicle, the sign 100 may be used to monitor the parking space 110 for security reasons. For example, the sensor 120 may detect movement around the parking space 110, such as a vehicle impacting the approved vehicle 150 and store the sensor data in the memory module 160 for later review. In a non-limiting example, the alarm of approved vehicle 150 (not shown) goes off and the beacon 152 instructs the sign 100 to store sensor data in the memory module 160. In a non-limiting embodiment, the short-range transceiver 130 is further configured to transmit the sensor data stored on the memory module 160 over the short-range communication channel 132.

In a non-limiting embodiment, the sign 100 has a power source 170 such as a battery to provide electrical power to the sign 100. In a non-limiting embodiment, the power source further includes a solar panel or a hardwired power source.

In a non-limiting embodiment, the sign 100 has an indicator 172 that is visible by a vehicle 150 in the parking space 110. In a non-limiting embodiment, the indicator 172 is a light emitting diode (LED), an LED array, an illuminated sign, a customizable marquee sign, or a visual indicator to warn a driver that they are parking their unapproved vehicle in the parking space 110. In a non-limiting embodiment, the indicator 172 is configured to display or otherwise convey to a driver of an approved vehicle that they are properly parking in the parking space 110. In a non-limiting example, the indicator 172 flashes green when an approved vehicle parks in the parking space 110 and the indicator 172 flashes red when an unapproved vehicle parks in the parking space 110.

In a non-limiting embodiment, the sensor 120 generates the sensor data based on a predetermined time interval, a detected motion proximate to the parking space 110, receipt of the vehicle identification key 154, and instruction received over the short-range communication channel 132, or a combination thereof. In a non-limiting example, the sensor 120 generates the sensor data, such as time lapse photographs or short videos, according to a predetermined time interval. As detailed above, the sensor 120 may also generate sensor data when motion is detected around the parking space 110 or the short-range transceiver 130 receives the vehicle identification key 154 from the approved vehicle. In a non-limiting example, the sensor 120 may also be instructed to generate sensor data based on an instruction transmitted over the short-range communication channel 132.

In a non-limiting embodiment, the sign 100 includes a long-range transceiver 134 configured to transmit at least one of the sensor data, the first notification 142, and the second notification 144 over a long-range communication channel 136. In a non-limiting example, the long-range communication channel 136 is a wireless data channel, such as those used by mobile phones to access the Internet, however the specific protocol used is not contemplated by the present disclosure.

In a non-limiting embodiment, the long-range transceiver 134 is configured to communicate with a remote server 190 over the long-range communication channel 136. In a non-limiting example, the long-range transceiver 134 is configured to transmit at least one of the sensor data, the first notification 142, and the second notification 144 to the remote server 190. The term "server," as used herein, generally refers to electronic component, as is known to those skilled in the art, such as a computer program or a machine that waits for requests from other machines or software (clients) and responds to them. In a non-limiting example, the remote server 190 waits for the sensor data, the first notification 142, or the second notification 144 from the sign 100. The remote server 190 then communicates with a user's mobile device (not shown) or the approved vehicle 150 to relay the information from the sign 100.

With reference now to FIG. 3 and with continued reference to FIG. 2, there is shown a non-limiting example of a system 200 for monitoring a parking space 110 for a vehicle 250. It should be appreciated that the overall architecture, setup and operation, as well as the individual components of the illustrated system 200 are merely exemplary and that differently configured systems may also be utilized to implement the examples of the system 200 disclosed herein. Thus, the following paragraphs, which provide a brief overview of the illustrated system 200, are not intended to be limiting. As similar components are used in the system 200 relative to the sign 100, similar reference numerals will be used and the description of system 200 will focus on the differences relative to the sign 100.

Relative to sign 100, system 200 for monitoring a parking space 110 for a vehicle 250 further includes a beacon 252 on the vehicle 250 configured to transmit a vehicle identification key 254 and communicate over the short-range communication channel 132. In this way, the system 200 includes the vehicle 250 and the beacon 252.

In a non-limiting embodiment of the system 200, the vehicle 250 includes a telematics unit 180 having a long-range transceiver 182 configured to communicate over a long-range communication channel 136. In contrast to the sign 100, the sign 202 does not have a long-range transceiver 134 and instead uses the long range transceiver 182 of the telematics unit 180 for long-range transmissions. In a non-limiting embodiment, the sign 202 transmits at least one of the first notification 142, the second notification 144, and the sensor data to the vehicle 250 over the short-range communication channel 132 and the long-range transceiver 182 transmits at least one of the first notification 142, the second notification 144, and the sensor data to the remote server 190 over the long-range communication channel 136. In this way, the system 200 using the long-range transceiver 182 already present in the vehicle 250 for long-range communications with the remote server rather than relying on a long-range transceiver 134 in the sign 100.

In a non-limiting embodiment, the remote server 190 is configured to transmit to the vehicle 250 an alert when the unapproved vehicle is identified in the parking space 110, an instruction to use a different parking space 110, an update that the parking space 110 is available, or a combination thereof. Stated differently, the remote server 190 communicates with the vehicle 250 using the long-range communication capabilities of the telematics unit 180.

In a non-limiting embodiment, the system 200 includes a plurality of signs 202 (also referred herein as "signs 202") that are configured to monitor a plurality of parking spaces 110. In a non-limiting example, the signs 202 monitor several parking spaces 110 in a parking lot, parking garage, etc. In a non-limiting example, the plurality of signs 202 form a sign network over the short-range communication channel 132 and share a shared long-range communication channel 136. By way of a non-limiting example, when there are multiple signs 202 monitoring multiple parking spaces 110, the signs 202 can interface over the short-range communication channel 136 and make use of a shared long range communication channel 136, such as a single vehicle 250 having a long-range transceiver 182. In this way, the network of signs 202 can communicate with one another over the sign network to relay information to the long-range transceiver 182 and, ultimately, the remote server 190.

In a non-limiting example, the sign network allows the signs 202 to act as a single monitoring system. By way of example, the signs 202 in the sign network may monitor the network for a sign malfunction or vandalism and transmit an alarm over the sign network and the long range communication channel 136. In a non-limiting example, the signs 202 of the sign network may each generate sensor data based on at least one of a predetermined time interval, a detected motion proximate to one of the parking spaces 110, receipt of the vehicle identification key 254, an instruction received over the short-range communication channel 132, or a combination thereof. Effectively, any instruction or act carried out by a single sign 202 my similarly be conveyed to all the signs 202 in the sign network.

Referring now to FIG. 4, and with continued reference to FIGS. 2-3, a flowchart illustrates a method 300 for monitoring a parking space with a sign in accordance with the present disclosure. In a non-limiting embodiment, the method 300 is performed by the sign 100 and system 200 detailed above. As can be appreciated in light of the disclosure, the order of operation within the method 300 is not limited to the sequential execution as illustrated in FIG. 4, but may be performed in one or more varying orders as applicable and in accordance with the requirements of a given application.

In various exemplary embodiments, the method 300 is run based on predetermined events, and/or can run continuously during operation of the sign 100 and system 200. The method 300 starts at 310 with detecting, with a sensor, a vehicle in the parking space. In a non-limiting embodiment, sensor 120 detects a vehicle 150, 250 in the parking space 110 of the previously discussed sign 100 and system 200.

At 320, the method 300 generates, with the sensor, sensor data when the vehicle is detected. In a non-limiting embodiment, the sensor 120 generates sensor data when the vehicle 150, 250 is detected of the previously discussed sign 100 and system 200.

At 330, a short-range transceiver receives a vehicle identification key from a beacon on an approved vehicle over a short-range communication channel. In a non-limiting embodiment, a short-range transceiver 130 receives a vehicle identification key 154, 254 from a beacon 152, 252 on an approved vehicle 150, 250 over a short-range communication channel 132 of the previously discussed sign 100 and system 200.

At 340, a processor module determines whether the vehicle is the approved vehicle or an unapproved vehicle based on the sensor data and the vehicle identification key. In a non-limiting embodiment, the processor module 140 determines whether the vehicle 150, 250 is the approved vehicle or an unapproved vehicle based on the sensor data and the vehicle identification key 154, 254 of the previously discussed sign 100 and system 200.

At 350, the processor module generates a first notification when the vehicle is determined to be the approved vehicle. In a non-limiting embodiment, the processor module 140 generates the first notification 142 when the vehicle 150, 250 is determined to be the approved vehicle of the previously discussed sign 100 and system 200.

At 360, the processor module generates a second notification when the vehicle is determined to be the unapproved vehicle. In a non-limiting embodiment, the processor module 140 generates the second notification 144 when the vehicle 150, 250 is determined to be the unapproved vehicle of the previously discussed sign 100 and system 200.

At 370 the short range transceiver transmits at least one of the first and second notifications and the sensor data over the short range communication channel. In a non-limiting embodiment, the short range transceiver 130 transmits at least one of the first and second notifications 142, 144 and the sensor data over the short range communication channel 132 of the previously discussed sign 100 and system 200. The method 300 then proceeds to 310 and detects additional vehicles as necessary.

In a non-limiting embodiment, the method 300 further includes 380 and a long-range transceiver transmits at least one of the first and second notifications and the sensor data to a remote server over a long-range communication channel. In a non-limiting embodiment, the long-range transceiver 134, 182 transmits at least one of the first and second notifications 142, 144 and the sensor data to a remote server 190 over the long-range communication channel 136 of the previously discussed sign 100 and system 200.

In a non-limiting embodiment, the method 300 further includes 390 and the remote server transmits at least one of an alert when the unapproved vehicle is identified in the parking space, an instruction to use a different parking space, an update that the parking space is available, or a combination thereof. In a non-limiting embodiment, the remote server 190 transmits at least one of an alert when the unapproved vehicle is identified in the parking space 110, an instruction to use a different parking space 110, an update that the parking space 110 is available, or a combination thereof of the previously discussed sign 100 and system 200.

In a non-limiting embodiment, the method 300 further includes 400-420. At 400 a plurality of signs (herein referred to as "signs") monitor a plurality of parking spaces. At 410, the signs form a sign network over the short-range communication channel. At 420, the signs share a shared long-range communication channel. The method 300 then proceeds to 380 and transmits the information to the remote server over the shared long-range communication channel.

In a non-limiting embodiment, the method 300 further includes 430-440. At 430 the sign network is monitored for a sign malfunction and sign vandalism. At 440 an alarm is transmitted over the shared long-range communication channel.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

The invention claimed is:

1. A sign for monitoring a parking space, the sign comprising:
   a sensor configured to monitor the parking space and generate sensor data;
   a short-range transceiver configured to receive a vehicle identification key and communicate over a short-range communication channel; and
   a processor module communicatively coupled with the sensor and the short-range transceiver, the processor module configured to determine whether a vehicle in the parking space is an approved vehicle or an unapproved vehicle based on the sensor data and the vehicle identification key,
   wherein the processor module is further configured to generate a first notification when the processor module determines that the approved vehicle is in the parking space and a second notification when the processor module determines that the unapproved vehicle is in the parking space, the first and second notifications transmitted by the short-range transceiver over the short-range communication channel.

2. The sign of claim 1, wherein the short-range communication channel is a wireless protocol selected from the group consisting of: a Bluetooth low power protocol, a Bluetooth protocol, a ZigBee protocol, an iBeacon protocol, an Eddystone protocol, a near field communication protocol, a Wi-Fi protocol, or a combination thereof.

3. The sign of claim 1, further comprising a memory module configured to store the sensor data, wherein the short-range transceiver is further configured to transmit the sensor data stored on the memory module over the short-range communication channel.

4. The sign of claim 1, further comprising a long-range transceiver configured to transmit at least one of the sensor data and the notifications over a long-range communication channel.

5. The sign of claim 1, wherein the sensor is selected from the group consisting of: a camera, a motion sensor, an ultrasonic sensor, or a combination thereof.

6. The sign of claim 1, wherein the sensor generates the sensor data based on at least one of a predetermined time interval, a detected motion proximate to the parking space, the vehicle identification key, an instruction received over the short-range communication channel, or a combination thereof.

7. A system for monitoring a parking space for a vehicle, the system comprising:
   a beacon on the vehicle configured to transmit a vehicle identification key and communicate over a short-range communication channel; and
   a sign comprising:
      a sensor configured to monitor the parking space and generate sensor data;
      a short-range transceiver configured to receive the vehicle identification key and communicate over the short-range communication channel; and
      a processor module communicatively coupled with the sensor and the short-range transceiver, the processor module configured to determine whether the vehicle in the parking space is an approved vehicle or an unapproved vehicle based on the sensor data and the vehicle identification key,
      wherein the processor module is further configured to generate a first notification when the processor module determines that the approved vehicle is in the parking space and a second notification when the processor module determines that the unapproved vehicle is in the parking space, the first and second notifications transmitted by the short-range transceiver over the short-range communication channel.

8. The system of claim 7, further comprising a memory module on the sign configured to store the sensor data, wherein the short-range transceiver is further configured to transmit the sensor data stored on the memory module over the short-range communication channel.

9. The system of claim 7, further comprising a telematics unit on the vehicle having a long-range transceiver configured to communicate over a long-range communication channel,
   wherein the sign transmits at least one of the first notification, the second notification, and the sensor data to the vehicle over the short-range communication channel and the long-range transceiver transmits at least one of the first notification, the second notification, and the sensor data to a remote server over the long-range communication channel.

10. The system of claim 9, wherein the remote server is configured to transmit to the vehicle at least one of: an alert when the unapproved vehicle is identified in the parking space, an instruction to use a different parking space, an update that the parking space is available, or a combination thereof.

11. The system of claim 9, wherein the sensor is configured to generate sensor data based on at least one of a predetermined time interval, a detected motion proximate to the parking space, the vehicle identification key, an instruction received over the short-range communication channel, or a combination thereof, and the telematics unit transmits the sensor data to the sensor data to the remote server.

12. The system of claim 7, further comprising a plurality of signs configured to monitor a plurality of parking spaces, wherein the signs form a sign network over the short-range communication channel and share a shared long-range communication channel.

13. The system of claim 12, wherein the plurality of signs each generate sensor data based on at least one of a predetermined time interval, a detected motion proximate to one of the parking spaces, the vehicle identification key, an instruction received over the short-range communication channel, or a combination thereof.

14. The system of claim 13, wherein the plurality of signs monitor the sign network for a malfunction and vandalism and transmit an alarm over the shared long-range communication channel.

15. A method for monitoring a parking space with a sign, the method comprising:

monitoring, with a sensor, the parking space;

detecting, with the sensor, a vehicle in the parking space;

generating, with the sensor, sensor data when the vehicle is detected;

receiving, with a short-range transceiver, a vehicle identification key from a beacon on an approved vehicle over a short-range communication channel;

determining, with a processor module, whether the vehicle is the approved vehicle or an unapproved vehicle based on the sensor data and the vehicle identification key;

generating, with the processor module, a first notification when the vehicle is determined to be the approved vehicle and a second notification when the vehicle is determined to be the unapproved vehicle; and transmitting, with the short-range transceiver, at least one of the first and second notifications and the sensor data over the short-range communication channel.

16. The method of claim 15, further comprising:
transmitting, with a long-range transceiver, at least one of the first and second notifications and the sensor data to a remote server over a long-range communication channel.

17. The method of claim 16, further comprising:
transmitting, by the remote server, at least one of an alert when the unapproved vehicle is determined to be in the parking space, an instruction to use a different parking space, an update that the parking space is available, or a combination thereof.

18. The method of claim 15, further comprising:
monitoring, with a plurality of signs, a plurality of parking spaces;
forming a sign network over the short-range communication channel;
sharing, over the sign network, a shared long-range communication channel; and
transmitting at least one of the first and second notifications and the sensor data to a remote server over the shared long-range communication channel.

19. The method of claim 18, further comprising:
scanning, by the beacon, a proximate area for mobile devices that are able to communicate over the first communication channel.

20. The method of claim 18, further comprising:
monitoring the sign network for a sign malfunction and a sign vandalism; and
transmitting an alarm over the shared long-range communication channel.

* * * * *